Jan. 9, 1962    J. W. LUCAS    3,016,141
MAIL SORTING APPARATUS AND METHOD
Filed Dec. 5, 1957    6 Sheets-Sheet 1

JOHN W. LUCAS,
INVENTOR.

BY Francis D. Ammen
Atty.

JOHN W. LUCAS, INVENTOR.

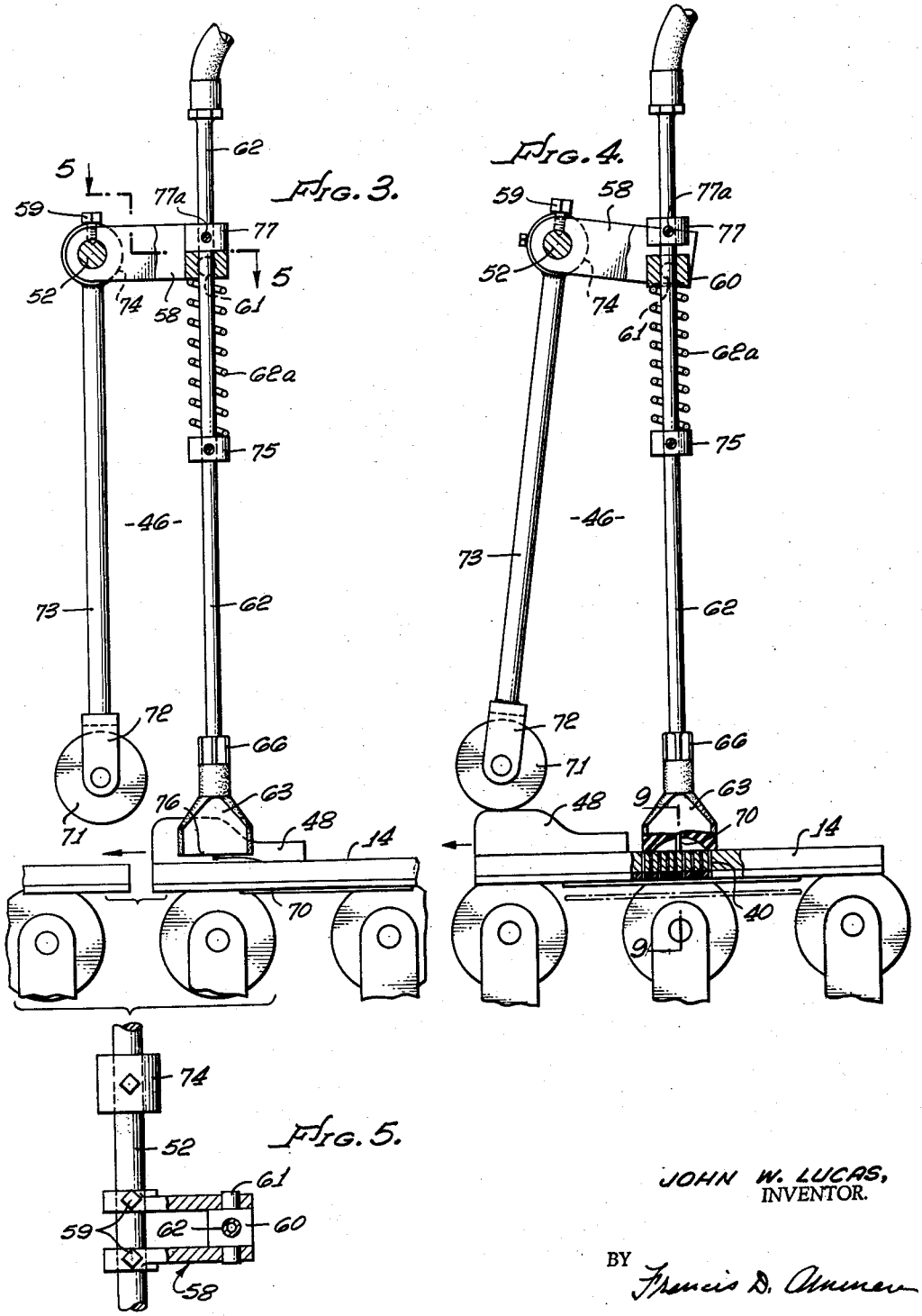

Jan. 9, 1962   J. W. LUCAS   3,016,141
MAIL SORTING APPARATUS AND METHOD
Filed Dec. 5, 1957   6 Sheets-Sheet 4
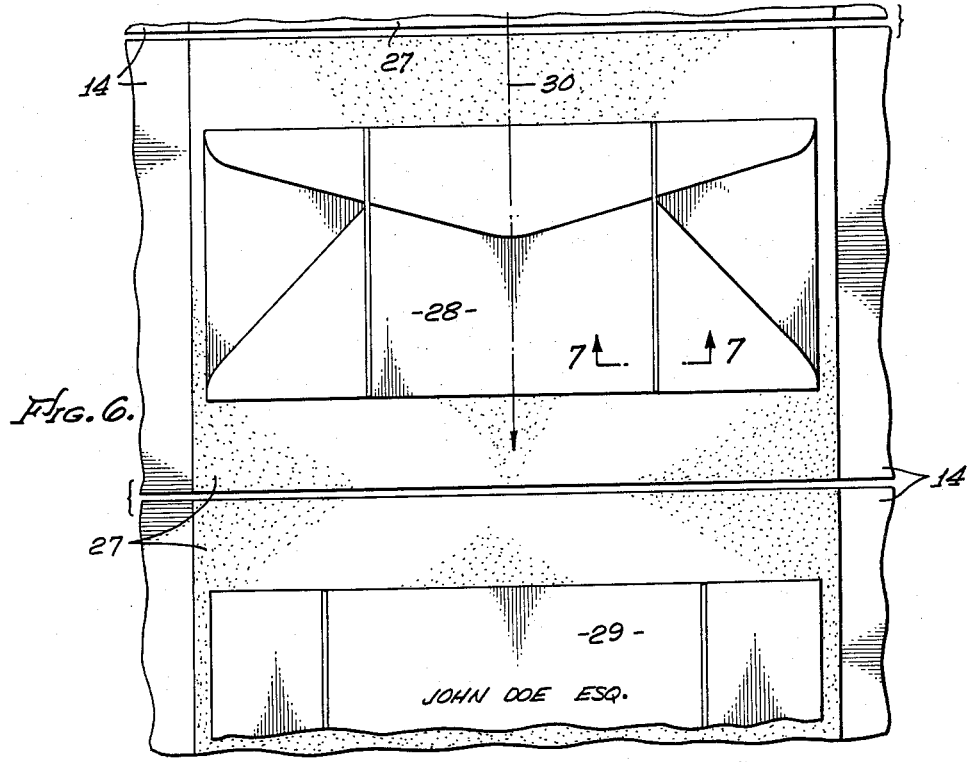
FIG. 6.
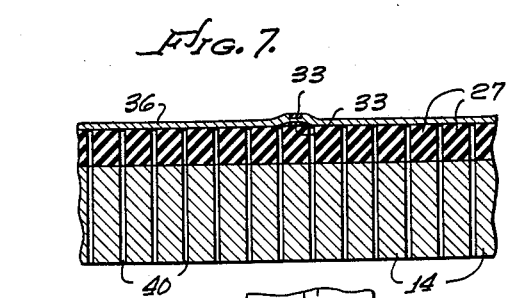
FIG. 7.
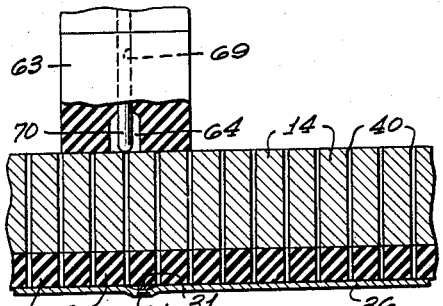
FIG. 8.
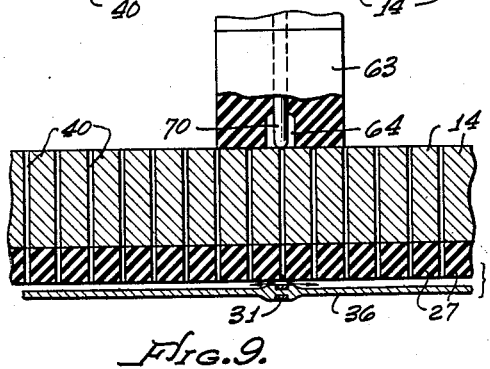
FIG. 9.
FIG. 17.
JOHN W. LUCAS,
INVENTOR.
BY *Francis D. Ammen*
*Atty.*

Jan. 9, 1962 J. W. LUCAS 3,016,141
MAIL SORTING APPARATUS AND METHOD
Filed Dec. 5, 1957 6 Sheets-Sheet 5

JOHN W. LUCAS,
INVENTOR.

BY
Atty.

Jan. 9, 1962 J. W. LUCAS 3,016,141
MAIL SORTING APPARATUS AND METHOD
Filed Dec. 5, 1957 6 Sheets-Sheet 6

JOHN W. LUCAS,
INVENTOR.

BY Francis D. Ammen

Atty.

United States Patent Office 3,016,141
Patented Jan. 9, 1962

3,016,141
MAIL SORTING APPARATUS AND METHOD
John W. Lucas, San Marino, Calif. (% Southwest Welding & Mfg. Co., 3201 W. Mission Road, Alhambra, Calif.)
Filed Dec. 5, 1957, Ser. No. 700,837
19 Claims. (Cl. 209—72)

This invention relates to an apparatus capable of functioning to effect the segregation of addressed envelopes that have been collected by the Post Office Department to be forwarded to their destinations; that is to say, segregated as to their destinations, for example, as to States, and as to principal cities in the different States.

It is a fact that today an enormous number of manhours are required in every large city each day to sort out the envelopes that are shortly to be north-bound, south-bound, or to be forwarded east or west.

One of the objects of this invention is to provide simple mechanism for accomplishing such sorting operations on collected mail, that will function to distribute collected envelopes or the like, to receiving stations, or into hoppers, where they can be picked up and assembled, ready to be introduced into mail pouches going to their single destination.

Another object of the invention is to provide a method of procedure that can be adapted to facilitate segregation of mail that has arrived in large packs at a large city, for example, a city such as New York from which arriving mail must be distributed to other large cities in that State, or nearby cities in adjoining States for which a large city such as New York or Philadelphia would be a distributing point.

The employment of the invention involves the use of certain indicia on each envelope that may be aptly called *mechanical* indicia which is distinctive to a certain single State of the United States of America, or in foreign countries, when it is employed in that certain country. In foreign countries the distinctive indicia would correspond respectively to adjacent foreign countries or to distant countries to which considerable portions of the collected mail would be forwarded.

Accordingly, another object of the invention is to provide a method of procedure that would enable the same mechanical indicia carried by the envelopes, to be used at a distributing city to cooperate with the mechanism of this invention to sort and segregate incoming mail for distribution for the mail going out to other foreign cities.

In its general construction the mechanism of this invention in the present instance involves the use of a supply magazine or hopper into which the envelopes or the like that are to be segregated as to "State destination," are placed in an orderly pack. The compartment holding the pack of envelopes is bottomless; and other objects of this invention are to provide means for successively removing the bottom envelope from the pack, to advance the same above a series of collecting "stations" or hoppers; and to provide automatic means for depositing each advancing envelope in its proper hopper of the series that corresponds to the "mechanical indicia" borne by that envelope.

The means for advancing the envelopes in succession that are taken from the supply hopper is preferably a conveyor, and one of the objects of the invention is to provide simple means for transferring a single envelope from the supply pack onto a carrier for it on the conveyor; also to provide means for effecting a connection between the envelope and the carrier that will enable the envelope to ride on the carrier to be transported by it to a point over its proper hopper that should receive it; and lastly to provide automatic ejector means for effecting the removal of each envelope from its carrier and effect its deposit at its proper station that corresponds to the "mechanical indicia" carried on each envelope.

One of the objects of the invention is to provide means located at each receiving station or receiving hopper that will operate automatically to dislodge the proper envelope from the conveyor to effect its deposit into its corresponding hopper.

In the present instance one of the objects of the invention is to provide pneumatic means for effecting the transfer of the successive envelopes from the supply hopper to the carriers of the conveyor and also pneumatic means for effecting the dislodging of the envelopes from their carriers when they are located over the hoppers respectively intended to receive envelopes with their corresponding mechanical indicia.

Another object of the invention is to provide an endless conveyor having special features of construction enabling it to cooperate with the supply hopper and the means associated with it, to effect the transfer of the envelopes to the conveyor; also to enable the conveyor to cooperate with the ejector means located at the envelope receiver hoppers to effect the transfer of the proper envelopes to them.

Another object of the invention is to provide a method involving the use of an effective mechanical indicia that can readily be applied to envelopes before being sold to stationery shops, so that after being sold the envelope will be addressed to the proper State that corresponds to the indicia and will be capable of cooperating with the mechanism of this invention to cause each envelope having that indicia to be deposited by the mechanism in the receiver hopper and having the indicated destination.

Another object of the invention is to provide a series of envelopes to be later addressed and posted in the mail, said envelopes including groups bearing identical mechanical indicia corresponding to a certain destination, and distinctively differing from all the other groups of envelopes of said series, said mechanical indicia capable of functioning cooperatively with an envelope sorting machine to cause all the envelopes of a group bearing the identical distinctive indicia to be deposited at the same point or hopper by the said sorting machine.

Further objects of the invention will be evident from a careful reading of this specification and study of the drawing accompanying the same.

The invention consists in the novel parts and combinations of parts to be described hereinafter, all of which contribute to produce an efficient mail sorting apparatus and method.

A preferred embodiment of the invention is described in the following specification, while the broad scope of the invention is pointed out in the appended claims.

In the drawing:

FIGURE 3 is an elevation with some parts shown in section, taken about in the plane of the line 3—3 of FIGURE 2. This view shows one of the ejectors for the envelopes about to be actuated by an approaching cam.

FIGURE 4 is a view showing the same parts that are shown in FIGURE 3, but shows them at a moment when two rollers are riding on cams on the conveyor to actuate the two ejectors associated with the receiving hopper for the ejected envelope that is located at a lower level.

FIGURE 5 is a fragmentary horizontal section taken about on the line 5—5 of FIGURE 3 and particularly illustrating a lever composed of two arms, the ends of which pivotally support the ejector stem that they support. This view shows the parts in a slightly different relation.

Figure 1:
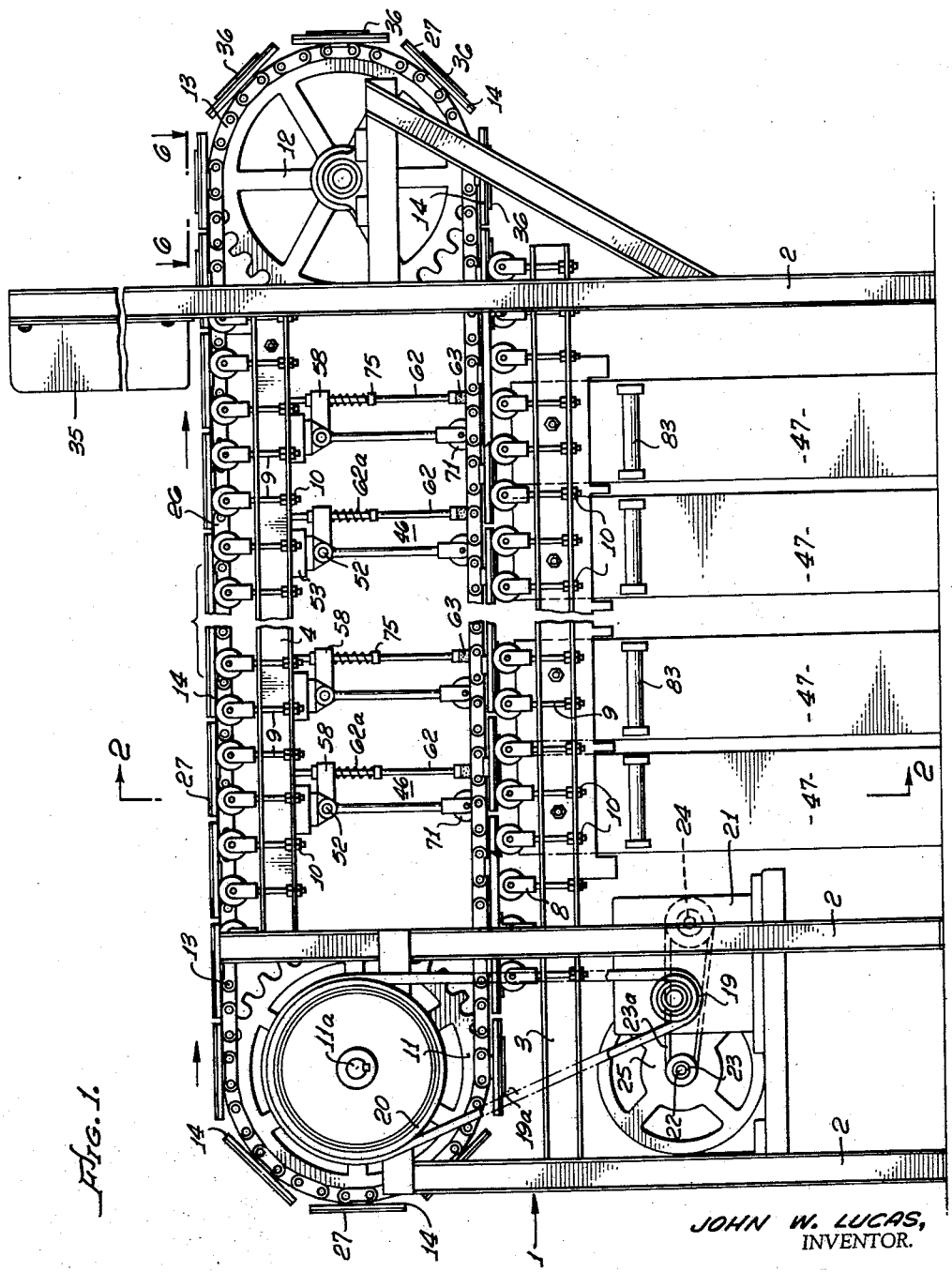
FIGURE 1 is a side elevation of a machine embodying this invention. At about its middle this view is broken away so as to economize space.

FIGURE 6 is a plan illustrating a short part of the conveyor, and showing a complete conveyor panel carrying a platen and an envelope on the platen extending transversely to the direction of travel of the platen with the conveyor. This envelope has its back uppermost, and the drawing shows a portion of a similar adjacent envelope wihch has its address side uppermost. These two envelopes carry mechanical indicia distinctive from each other as will be presently explained. This view is supposed to be seen from a horizontal plane at about the location of the line 6—6 at the right of FIGURE 1.

FIGURE 7 is a vertical section on the line 7—7 of FIGURE 6 taken in a plane parallel with the longitudinal axis of the conveyor, and is upon a magnified scale. It particularly illustrates details of one of the mechanical indicia, two of which are applied to every envelope that is contained in the pack of envelopes that are placed into the supply hopper from which the envelopes are withdrawn, one at a time as they pass onto the carrier platens mounted on the conveyor. This view shows how the mechanical indicia cooperates with the facing on a platen to hold the envelope adhering to it while still in the upper run of the endless conveyor, at which time the envelope is above the platen.

FIGURE 8 is also a side elevation and partial section in a vertical plane parallel to the longitudinal axis of the conveyor, and shows the ejector head as though just coming into contact with the upper face of such a panel when advancing in the lower run of the conveyor. This view shows one of a pair of ejector heads out of line with one of the indicia ribbons where it will be incapable of dislodging the envelope by means of the air jet that is blown down through the perforations in the panels.

FIGURE 9, however, shows an ejector head at an operative position in which it releases compressed air directly in line with one of the latex ribbons of an envelope where it can dislodge the envelope from the panel which is carrying it.

Figure 10:
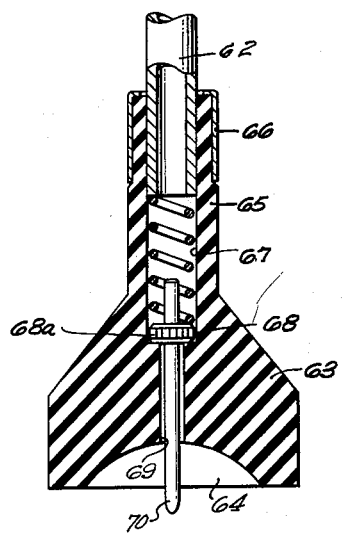

FIGURE 10 is a detail vertical section through the entire pneumatic head of one of the ejectors and illustrating a spring loaded valve that is opened automatically when the pneumatic head reaches the low position of its travel.

Figure 11:
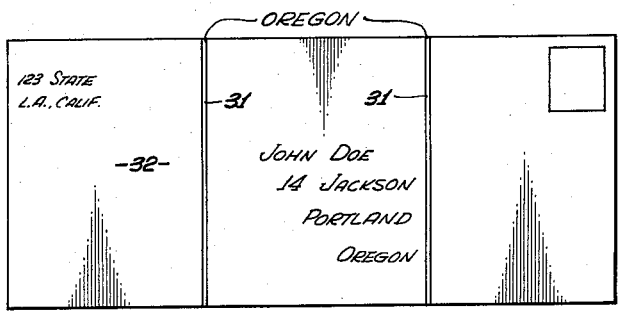
Figure 12:
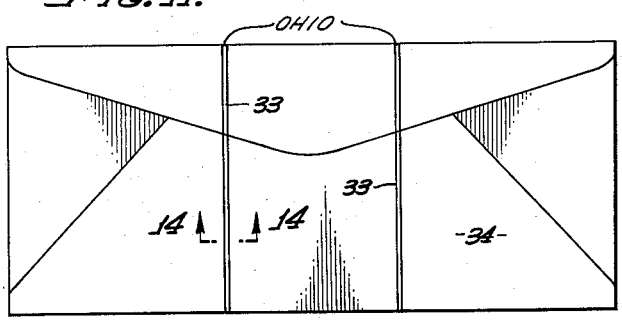

FIGURES 11 and 12 show respectively two envelopes one of which presents the forward face of an envelope, and the other the rear face of such an envelope. Both of these envelopes are provided with distinctive mechanical indicia. These indicia are distinctive from each other, and from all the other envelope groups in the entire series of envelopes employed with the sorting machine.

Figure 13:
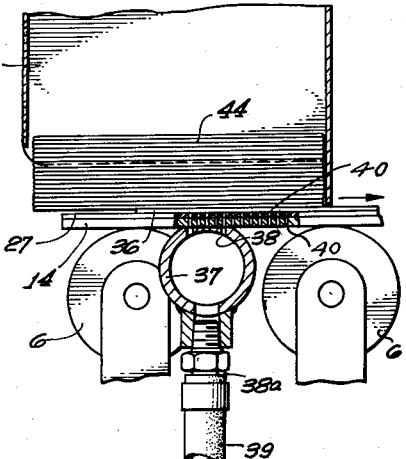

FIGURE 13 is a vertical section through the supply hopper that contains a pack of envelopes and shows a platen in the act of passing from under the supply hopper. This platen is shown partially in section to show perforations passing down through the platen facing and the metal body of the platen toward a transversely disposed vacuum head with perforations in its upper face to create a partial vacuum in the perforations of the platen, and draw the bottom envelope of the pack down and effect its coherence to the platen below it. As will be noted, this view shows the platen on its way out from under the supply hopper.

Figure 14:
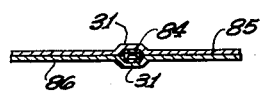

FIGURE 14 is a vertical section through the envelope shown in FIGURE 12. This view is upon a highly magnified scale so as to illustrate a feature of construction of the mechanical indicia that assures that two envelopes having the same destination and like mechanical indicia will not cohere to each other.

Figure 15:
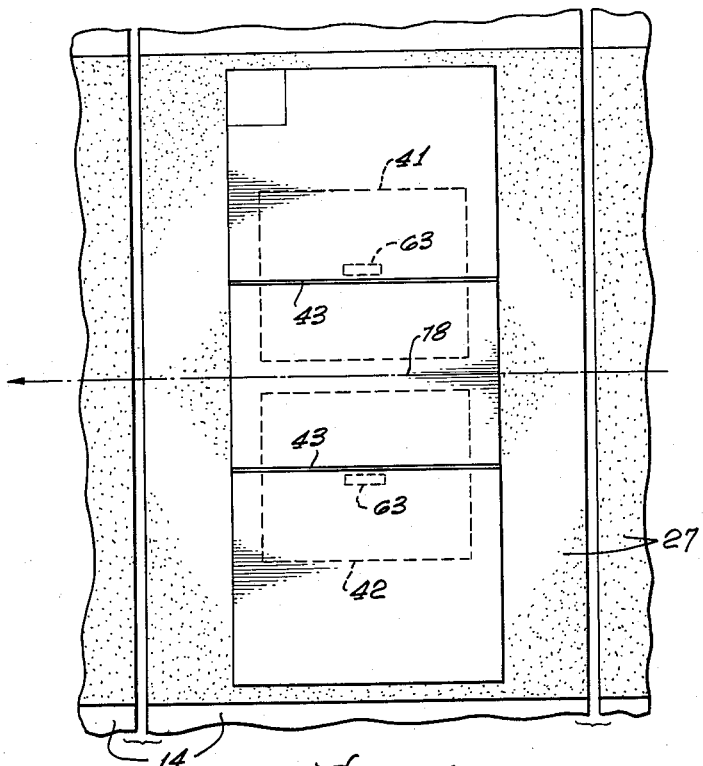

FIGURE 15 is a plan of a portion of the upper run of the conveyor, showing a platen with an envelope carried on it, and showing the outline of the areas of perforations in dotted lines; also showing the mechanical indicia and indicating the location of the pneumatic ejector heads in dotted lines.

Figure 16:

FIGURE 16 is a fragmentary view illustrating the preferred staggered distribution of the perforations through the platens.

FIGURE 17 is a cross-section of a valve stem employed with the ejector heads and indicating a slight modification of its form that may be employed, if desired.

Figure 18:

FIGURE 18 is a bottom plan of the ejector heads illustrated in FIGURE 10, and particularly illustrating the slot-form mouth in its lower face.

Referring now particularly to FIGURES 1 to 5 inclusive, the apparatus comprises a machine having a frame 1, including pairs of posts 2 the individuals of which are located on opposite sides of the structure. Between the pairs of posts horizontal frame bars 3 and 4 are supported on the posts or columns 2, to which they may be secured by welding.

All of these frame members are preferably welded together at their joints; and are all of channel cross-section as illustrated, the horizontal members being of deep box-form with their lower flanges resting on angle iron clips 5 welded to the inner faces of the posts.

The horizontal channel bars 3 and 4 support two runways, an upper runway, composed of rubber rollers 6 and a lower runway composed of similar rollers 7. All of these rollers are mounted between forks 8 to rotate in vertical planes extending longitudinally of the frame 1, the forks being supported on stems 9 that pass down through socket holes in the upper flanges of the channels 3 and 4.

The lower ends of the stems 9 are threaded and pass down through socket holes in the lower flanges of the channels and their reinforcing angle irons 5 where they are held fixed against rotation by tightened nuts 10. (See FIGURES 1 and 2.) The presence of the threads makes the roller heights adjustable. (See FIGURES 1 and 2.)

Figure 2:
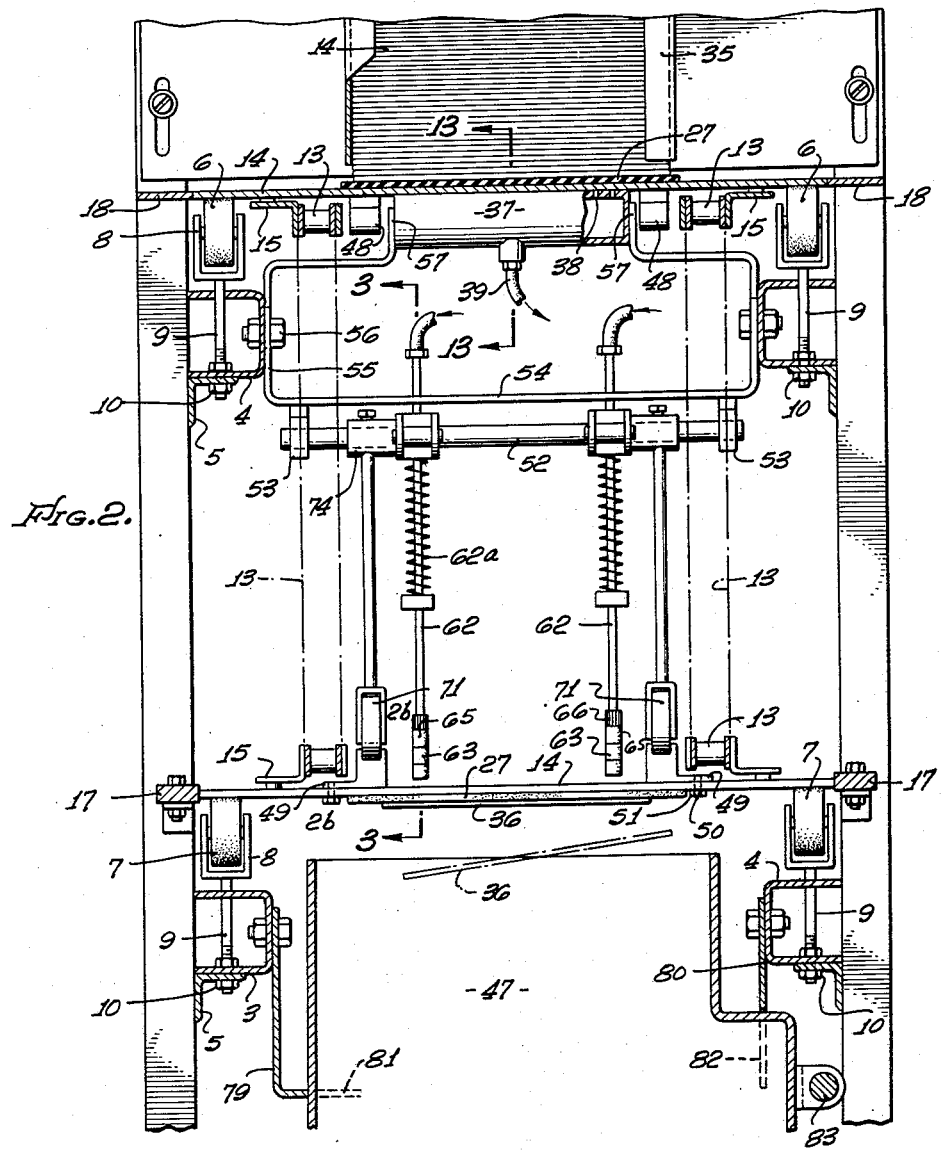
FIGURE 2 is a vertical section taken in the plane of the line 2—2 on FIGURE 1, and looking in the direction indicated by the arrows.

At the ends of the frame 1 a pair of sprocket wheels 11, and a pair of sprocket wheels 12 are supported, aligned with each other so as to support two endless chains 13 that run over them. These endless chains are connected together by cross-panels 14. The panels that are steel plates of suitable thickness are carried on the runs of the endless chains as indicated in FIGURE 2, by providing outside links in the chain, at intervals with horizontal flanges and two spaced short studs 15 connect these links to the inner faces of the panels. As the panels 14 pass along the sides of the frame their sides edges are guided along the inner faces of accurately fitted lower guide bars 17, and upper guide bars 18 for guiding the panels of the upper run of the conveyor fabricated as described onto the endless chains.

At the driven end of the conveyor the two sprocket wheels 11 are rigid on a common shaft 11a, and one of the sprocket wheels at this end is driven from a relatively small drive pulley 19 by a flexible V-belt 19a that runs over a larger pulley 20 keyed on the shaft.

The driving pulley 19 is driven by a reduction gear in a casing 21 and the reduction gear is driven by a small pulley 22 on the shaft 23 of an electric motor. The input drive-shaft 24 shown in dotted lines in FIGURE 2 is driven from the pulley 22 by a V-type leather belt 25.

The upper run 26 of the conveyor moves toward the right as viewed in FIGURE 1 and is indicated by the arrow just above this upper run.

The panels 14 in this run are held in a relatively elevated position and their upper faces carry platens 27 (see FIGURE 6) which are in the form of facings of a material having the properties of latex, and in the present instance latex is a material which is preferable to use.

In accordance with my invention I utilize envelopes such as the envelopes 28 and 29 that have been provided with distinctive indicia that corresponds to the destination of the envelopes when carrying a letter in the mail. In other words, envelopes that are to be used and applied with distinctive indicia, are provided with indicia, but this indicia is applied in lines across the envelopes on this forward faces and on their rear faces; and in practice, I prefer to use narrow strips of latex ribbon which are placed around the envelopes preferably at equidistant points from the transverse medial axis 30 of the envelope. This, of course, makes the envelope distinctive to its destination. For example, as indicated in FIGURES 11 and 12 the distance between the latex strips 31 shown there corresponds to a certain State, for example, Oregon, on the upper envelope 32 while the distance between the latex lines or strips 33 is distinctive to the lower envelope to be used for the State of Ohio.

The practice of the invention as regards the use of distinctive indicia corresponding to any State or city which is the destination of any envelope being handled through the sorting machine depends upon the fact that when this material is present on two surfaces that are pressed together, the surfaces will cohere to each other.

This faculty is utilized to enable the envelopes to be transferred to the platen faces in succession from a supply hopper, and also permits the use of suitable pneumatic ejector means to effect the dislodgement of the envelopes when the pairs of ejectors are respectively in line with the latex strips over the "station" or collecting hopper for the State that corresponds to the distinctive distance apart and relative location of the indicia, when the envelope is moved by the conveyor into alignment with the respective ejectors.

In referring to this property, that a dry coating latex will cohere to a dry latex surface when pressed against the same, I have said that the coated areas have *mating* characteristics, and while latex to latex attains the desired effect, any other material or two materials which will cohere in a dry state when pressed together, could be used in the practice of this invention.

However, the above refers particularly to the removal of the envelopes from the lower run of the conveyor and reference will now be made to the means for effecting their removal in succession from their supply magazine or hopper 35. This mechanism is illustrated in detail in FIGURE 13.

As shown in FIGURE 13 this supply hopper is located on the right end of FIGURE 1, and its lower end is bottomless, as indicated in FIGURE 13. Its open lower end lies quite close to the upper facing of the platens as they pass under this hopper.

In FIGURE 13 one of the platens is indicated as though passing away from the hopper after having received its bottom envelope 36. In order to accomplish this removal a transverse tubular suction head 37 is provided which lies just below this hopper and preferably near its medial axis that extends transversely to the direction of movement of the upper run of the conveyor as it advances the platens 27 past the supply hopper.

A partial vacuum is maintained in the interior of this suction head, for which purpose a pneumatic connection 38a is attached to the under side of the suction head and carries a hose 39 which leads to a fan or exhaust pump, not illustrated.

The upper side of the suction head has a polished flat face and is provided with small orifices, preferably rows of perforations 38 capable of developing an induction effect on air in their vicinity and immediately above the suction head. The polished upper surface of the suction head is desirable for the purpose of easing the passing of each panel 14.

The platens 27 and the panels 14 carrying them are provided for a considerable portion of their areas with perforations 40 which are distributed quite close together as illustrated in FIGURE 16; in the present instance they are 1/32 of an inch in diameter spaced in staggered relation with about 3/32 between centers. In FIGURE 15 the rectangular dotted outlines 41 and 42 indicate the preferred location of these perforations. The size of these areas 41 and 42 depends upon the number of States, countries, and cities that this machine is intended to serve in sorting mail directed to the same; these envelopes are addressed to the different States, countries, or cities, and each envelope bears a distinctive indicia such as the lines 43, or strips of a cooperating cohesive substance such as latex, the surfaces of which will cohere to the facing 27.

As each platen 14 passes under the supply hopper 35 it establishes connection from the partial vacuum in the suction head 37 at the under side of the panel and platen 14 above it. The perforations 38 withdraw the air from the perforations 40 that extend down from above, with their mouths or upper inlets located immediately under the bottom envelope 36.

In this way the suction effect is passed onto the upper face of each platen, whereupon the air pressure on the upper side of the bottom envelope of the pack moves it down onto the upper face of the platen. Whereupon the latex strips attach themselves *and* their envelope to the latex facing 27 on the platen.

The perforations, or some of them, are in the vicinity of the lines or strips of the latex, as shown at 31 and 33 in FIGURES 11 and 12, and the air pressure from above causes each pair of latex strips on the bottom envelope to press themselves against the latex facing 27 to which they cohere. This latex facing covers each platen that is carried by each panel 14 (see FIGURE 7).

In this connection it should be remembered that the latex ribbon 31 or 33 are located on both faces of each envelope so it is immaterial whether the rear side of any envelope is at the lower side or not.

As each panel is loaded with an envelope in this way as a carrier for it, the continued movement of the conveyor carries each envelope, such as 36, around the common axis of the two sprocket wheels 12 at the right end of the machine, following which the panels move back toward the left end of the machine; so, they pass in the lower run of the conveyor, being supported on the rollers 7 of that run as indicated in FIGURE 1.

In accordance with my invention I provide means for dislodging the envelopes from the carrier panels when they are over the different receptacles that correspond to the different destinations of the envelopes and to which the envelopes are addressed. A preferred means for accomplishing this will now be described.

As they pass along in the lower run, the panels, of course, travel past a series of ejector assemblies 46 that are disposed in pairs, each pair being located over one of a series of receiving collecting hoppers 47 each of which is intended to have deposited in it envelopes directed to one destination, for example, certain State, county or city.

The ejectors at each station are spaced apart a distinctive predetermined distance from each other that is the same as the spacing apart of the strips on every envelope that is destined for the station with which they are associated; and the ejectors are also spaced in the same relation to the medial axis of the platen as are the said strips to enable them to blow the envelopes down into the hopper below them.

Every panel 14 carries two cams 48 in line with rollers carried by the ejector assemblies for actuating them.

These cams are adjustable on their panels 14 (see FIGURES 2, 3, and 4).

Referring to FIGURE 2, in order to render these cams adjustable they are provided with outwardly projecting flanges 49, respectively, each flange being provided with two studs 50 running in a slot 50a in each panel 14 (see FIGURE 2b), and capable of being secured in any desired adjusted position by loosening and then tightening up the nuts 51 on their bolts.

Referring now to FIGURES 3, 4, and 5, each pair of ejector assemblies is mounted on a horizontal cross shaft 52 supported rotatably in hanger brackets 53. These brackets are supported from the under side of an inner frame 54, as shown in FIGURE 2. This frame in the present instance, is of strap iron bent to a substantially rectangular form with its ends 55 attached by bolts 56 to the webs of the upper channel-form frame members 4. Above this point the strap material extends inwardly at two points on the rectangular line, and are bent upwardly to form ears 57 that are secured to, and support the ends of the transverse suction-head 37 shown in detail in FIGURE 13.

The ejector assemblies include this common rock-shaft 52, and each individual assembly has an arm 58 composed of two forks each of which is secured to the rock-shaft 52 by a set-screw 59. By means of these set screws the ejector heads are secured so that they will be fixed in alignment with only one of the lines of latex on the upper face of a certain envelope that corresponds to a certain destination. Between the forks of the short lever arm 58, a block 60 is pivotally attached on horizontal gudgeons 61 pivoted in the forks of the arm; and through an opening in this fork a tubular stem 62 extends downwardly, and slides freely; at its lower end it carries a pneumatic head 63. This head and its position in order to blow off its proper envelope is shown in FIGURE 9 is illustrated in detail in FIGURES 9 10 and 11.

FIGURE 10 is upon a greatly enlarged scale. The blower head is composed of fairly elastic plastic or rubber at its lower end. Its body is considerably elongated in a vertical plane parallel with the longitudinal axis of the conveyor, and at its lower end has an orifice 64 greatly elongated in the same direction, parallel with the longitudinal axis of the conveyor; this is to enable it, when in contact with the upper face of the platen, to span a considerable number of the holes 40. It has an elongated neck 65 at its upper end that telescopes over the lower end of the pneumatic tubular stem and is fixed there by reason of the fact that the upper end of this neck is encased in a metal ferrule 66 that limits the radial expansion of the elastic neck.

The bore 67 of the tubular neck, houses a valve-head 68 that seats at the lower end of this bore so that it normally closes an air passage 69 that also functions as an oversize guide for a valve stem 70 that hangs down from the valve head. The passage 69 conducts compressed air down to the mouth-form orifice 64.

The valve-head 68 normally closes the upper end of the air passage 69, but when each cam 48 engages a roller 71 carried in a forked yoke 72 at the lower end of a stem-like lever 73, that is pendant from its sleeve 74, the bifurcated lever 58 rocks downward, as indicated in FIGURE 4. The notches 68a shown in FIGURE 10 in the edge of the valve head increase the effective valve opening.

When this occurs the block 60 exerts downward pressure through a coil spring, 62a encircling the tubular stem 62, which pressure is imparted through a collar 75 to the tubular stem 62.

This moves the stem down sufficiently to seat the bottom face 76 on the upper face of the platen 14; when that occurs, the tip of the valve stem 70, which normally projects down from the pneumatic head, impinges on the upper face of the platen 14, which relatively raises the valve disc 68 off its seat and permits compressed air to pass down the passage 69 to the mouth like chamber 64, and this plentiful supply of air passing down the perforations 40 will dislodge the envelope such as 32 or 34 that is adhering to the carrier platen and blow it off at the "station" or receiving hopper 47 that corresponds to the width of the gap between the two mechanical indicia lines or stripes such as stripes 43 (see FIGURE 15).

Of course the blower heads 63 corresponding to a certain gap between the indicia stripes will be adjusted on their common rock-shaft such as rock-shaft 52, so as to enable the two blower-heads indicated in dotted lines on FIGURE 15, are in line with their corresponding indicia bands or stripes such as 31, 31 or for example 33, 33. This relation for one blower is shown clearly in FIGURE 9. Of course each ejector assembly is actuated by the cam of each platen as it passes a roller on the assembly, but the envelope on the platen can only be blown off when properly placed blower heads are on their correspondingly spaced latex lines.

In order to insure ample supply in the compressed air current that comes past the valve-head 68, the edge of the valve should have notches 68a cut in its edge.

And in order to facilitate adjusting the blower heads into alignment with the indicia stripes the bifurcated lever 58 should be provided with two set-screws 58a as shown in FIGURE 5, for holding the sleeve 74 securely on the cross shaft 52, after they are adjusted to align the blower heads 63 with the stripes on envelopes corresponding to the different destinations of the envelopes.

The upper ends of the tubular stems 62 for the blower heads 63 carry adjustable collars 77 with set-screws 77a for that purpose. The position of these collars in the position of rest of the ejector assemblies determines the height of the bottom face 76 of each blower head 63 above the upper face of the platen.

Referring to FIGURES 11 and 12 which show the indicia strips 31 and 33 as passing along both faces of the envelopes, it should be stated that the reason for applying these strips to both faces of the envelopes is that it permits of the envelopes being placed in the supply hopper with either face *down*.

In other words, the envelope 34 shown in FIGURE 12, when moved down by the pneumatic head 37 will stick itself to the upper face of the platen 27, practically as well as the envelope 32 would do so; and referring to FIGURE 18 it should be noted that the mouth 64 widened as it is shown in FIGURE 10, is actually of narrow width, terminating in a slot as shown in FIGURE 18. This slot 64 is narrow enough so that when one certain pair of pneumatic heads are moved down to seat on to the upper face of each platen to effect the dislodgement of an envelope below it, the slot will be in line with a single row of the perforations 40. Because of this alignment the air pressure against the face of the envelope will blow that envelope down into its proper designated receiving receptacle.

Figures 2A, 2B:
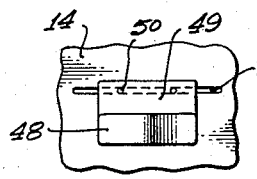
FIGURE 2a is a fragmentary view corresponding to FIGURE 2 and illustrating the relation of the cooperating parts when a panel carrying an envelope is located under the two ejectors shown in FIGURE 2. It shows how and why an envelope that should be ejected into a different one of the collecting hoppers will not be blown off by the blower heads distinctively spaced as in FIGURE 2.
FIGURE 2b is a fragmentary plan view of one of the cams used in the mechanism, and is taken on the line 2b—2b of FIGURE 2.

In FIGURE 15 a relative position of the pneumatic heads of each pair may happen to be as illustrated in dotted lines in this figure. They would not be exactly over the strips such as 43, but slightly to the outer sides of the same; and while in FIGURE 15 they have been shown at the far side of the strips with relation to each other, for effective operation they would better be at the inner sides of the strips, if not in perfect alignment. If alignment of the blower heads with the strips occurs as shown in FIGURE 8 the envelopes will be blown off. If such alignment is not established the envelope will not be blown off. This occurrence is illustrated in FIGURE 2a in which the strips indicated generally by the letters *s,s* are out of line with the blower heads. The end portions 36b of the envelope 36a will be blown down by the air currents from the blowers as shown by the arrows 36c, but this will not detach the envelope 36a.

While it is contemplated to employ approximately fifty rows of the perforations 40 in each of the areas 41 and 42, passing through the platens and panels below the same, which lines are disposed longitudinally with respect to the direction of movement of the lower run of the conveyor, it should be understood that increases of this number of lines of perforations could be made, if desired, to adapt the machine to sorting mail addressed to a greater number of destinations, but ordinarily fifty lines of perforations 40 on the areas 41 and 42 would enable the platens to operate effectively for carrying and dislodging or discharging standard size small envelopes as well as standard size large envelopes.

The use of fifty lines in each of these areas 41 and 42 would enable a great number of distinctive indicia to be used, for it is obvious that it is not essential to have the two indicia strips for any State or city to be located precisely at the same distance from the central axis line 78 of each panel (referring to FIGURE 15), but quite a number of variations of the selection of certain lines of these perforations 40 could be effected by keeping one of the blower heads 63 in the same position that it would occupy when spaced the same distance from the axis line 78 as the other blower head, and spacing the other blower head further away by an additional line space, or more than this. Doing so would result in changed indicia strips that would correspond to other States, or cities.

Proceeding in this way by changing the location of only one of the blower heads' location, step by step further away or nearer to the other, it will be evident that the capacity of platens with 50 lines of perforations in each of the areas 41 and 42 could be multiplied by 5 or 10.

However, this, of course, would entail increasing the number of receiving hoppers, and the lengthening of the conveyors. Incidentally, as indicated in FIGURE 2, these hoppers 47 are lined up in their proper positions by means of two sheet metal aprons 79 and 80 (see FIGURES 1 and 2) that are bolted to the webs of the channel form frame members 3 and 4. The lower portions of these aprons have sockets 81 and 82 cut in their edges that are wide enough to accommodate the width of the hoppers, when shoved into place or removed by an attendant who would seize their handles 83 in accomplishing this.

In connection with the envelopes, and referring to FIGURE 14, it should be stated that when a stationery manufacturer applies the narrow ribbons of plastic to the envelopes a relatively soft pad should be placed under the envelopes which results in embossing the ply of the envelope to which the ribbon is being applied, as well as causing the latex ribbon to adhere to the upper surface of the envelopes. This also results in developing a slight depression or shallow groove 84. This is desirable as it enables the stripes such as 31 to lie below the normal surface of the envelopes, and this will prevent two envelopes destined for the same State or city to stick together in case they happen to come adjacent to each other in the supply hopper.

In FIGURE 14 the upper ply 85 of paper could be the under fold of an envelope destined to go to New York State while the lower ply 86 could be the upper ply of an envelope having the same destination. The embossing forming the grooves would prevent the stripes of latex from touching each other.

The tubular stems 62 are supplied with compressed air through flexible hose connections 87 connected to their upper ends by threaded couplings.

Many other embodiments of this invention may be resorted to without departing from the spirit of the invention.

I claim as my invention and desire to secure by Letters Patent:

1. In mechanism of the class described, the combination of an endless conveyor having a plurality of platens in succession with facing sheets of latex adhering to the outer faces thereof, said platens and facing sheets having perforations through the same, a supply hopper having an open bottom for maintaining a pack of envelopes in face down relation above and adjacent to the upper run of the conveyor with the lowermost envelope of the pack exposed through said open hopper bottom, a vacuum suction head under the said upper run and in line with the supply hopper, means for actuating the conveyor to advance the platens under the hopper, and a connection to the suction head for maintaining a partial vacuum in said suction head operating through the agency of the perforations to draw the envelopes which are successively exposed at the open bottom of the hopper down against the respective platens as the same are passed in succession between the supply hopper and the suction head, said envelopes having a composition for cohesion with the facing sheets of latex.

2. In mechanism of the class described, the combination of an endless conveyor having a plurality of platens with facing sheets of latex adhering to the outer faces thereof, said platens and facing sheets having perforations through the same, a supply hopper for maintaining a pack of envelopes above and adjacent to the upper run of the conveyor, a vacuum suction head under the said upper run and in line with the supply hopper, and a connection to the suction head for maintaining a partial vacuum in said suction head operating through the agency of the perforations to draw the bottom envelope down against the platens in succession when the same are located between the supply hopper and the suction head, said facing sheets and said envelopes having a composition enabling the envelopes upon contact with pressure to cohere to each platen, and effect attachment of each envelope to the facing sheet of each of the platens.

3. In mechanism of the class described, the combination of an endless conveyor having a plurality of platens with facing sheets of latex adhering to the outer faces thereof, said platens and facing sheets having perforations through the same, a supply hopper for maintaining a pack of envelopes above and adjacent to the upper run of the conveyor, a vacuum suction head under the said upper run and in line with the supply hopper, and a connection to the suction head for maintaining a partial vacuum in said suction head operating through the agency of the perforations to draw the bottom envelope down against the platens when the same are located between the supply hopper and the suction head, said facing sheet and said envelopes having a composition enabling the envelopes upon contact with pressure to cohere to each other, and effect attachment of the facing sheet of each envelope to the facing sheet of each platen, the said suction head comprising a tubular body extending transversely to the upper run of the conveyor and having a line of perforations through its upper wall operating to withdraw atmospheric air from the space below the bottom envelope in the pack.

4. In mechanism of the class described, the combination of an endless conveyor having a plurality of platens with facing sheets of latex adhering to the outer faces thereof, said platens and facing sheets having perforations through the same, a supply hopper for maintaining a pack of envelopes above and adjacent to the upper run of the conveyor in face down relation said hopper having an open bottom discharge through which the bottom envelope of the pack is exposed, a vacuum suction head under the said upper run of the conveyor and in close proximity to the undersurface of the platens and in line with the discharge opening of the supply hopper, and a connection to the suction head for maintaining a partial vacuum in said suction head operating through the agency of the perforations to draw the bottom envelope down against the platens when the same are located between the supply hopper and the suction head, the said suction head comprising a polished upper face to facilitate free sliding movement of the platen-carried envelope when being advanced past the same by the upper run of the conveyor.

5. As new articles of manufacture to cooperate with a mail sorting mechanism, carrier-platens for envelopes, each carrier-platen having a rigid plate-form body with a facing sheet of latex adhering to the face thereof, envelopes corresponding to different places that are the destination of said envelopes, said envelopes having strips of a substance applied on their faces, said strips being disposed a distance apart that is distinctive to the destination to which the envelope is addressed, said strips and said latex facing operating to cohere when the same are in contact with each other and pressed together, and thereby cause the envelope to adhere to the carrier-platens.

6. Mechanism for sorting envelopes or the like, for mailing with respect to a plurality of destination points, said envelopes each having areas of an adhesive on their respective surfaces spaced apart a distinctive distance corresponding to a predetermined destination point, the combination of a frame, a plurality of rigid perforated carrier platens each having a facing secured thereon composed of an adhesive substance to cooperate with said areas said envelopes for effecting the cohesion of the said envelopes to the said facing, a supply hopper for containing a stack of said envelopes in face down relation, the hopper being provided with a bottom discharge opening through which the bottom envelope of the stack is exposed, conveyor means for advancing said carrier platens past the supply hopper, means for transferring the bottom envelope in the said stack from said hopper to the said platens in succession as they pass the hopper, and for pressing the adhesive substances together to effect the attachment of each envelope to a predetermined carrier platen, a plurality of movable pneumatic ejector heads with air outlets, on said frame, and disposed in pairs above said conveyor and spaced apart from each other distances to correspond respectively with the distinctive spacing apart of the said adhesive areas on said envelopes, automatic means for advancing said pneumatic heads towards the conveyor to place their outlets in communication with the said perforations of each carrier platen as it passes the location of said ejector heads; and means including air conduits for supplying air currents to said ejector heads to blow the envelopes out of contact with their carrier platens.

7. Mechanism for sorting envelopes or the like, for mailing according to claim 6, in which said hopper cooperates with the upper faces of the platens on the upper run of the conveyor, and the said ejectors cooperate with the opposite face of the platens when they are on the lower run of the conveyor.

8. Mechanism for sorting envelopes or the like, for mailing with respect to a plurality of destination points according to claim 6, in which the said pneumatic heads have perforated flexible faces, and including automatic means for actuating the pneumatic heads to advance them to engage the surface of the platen for directing air through the perforations of the platens to dislodge the envelopes from the faces thereof.

9. Mechanism for sorting envelopes or the like, according to claim 6, in which the conveyor carries the said platens on the upper run of the conveyor so as to pass the platens in face up relation horizontally below the hopper and under the bottom envelope in the stack therein, and wherein the means for transferring the bottom envelope in the stack to the respective platens includes a transversely disposed tubular suction-head disposed beneath the hopper and below the path of the upper run of the conveyor and the platens, said suction head having a plurality of perforations on its upper face adapted to communicate with the perforations in the platens and cooperating therewith to enable a partial vacuum developed in the suction head to draw down the bottom envelope in the hopper and effect its attachment to the facing on the platen by reason of the cohesive quality of the complemental adhesive substances.

10. Mechanism for sorting envelopes or the like, according to claim 6, in which the said pneumatic heads are carried on stems pivotally attached to arms respectively; and means including pivotally mounted transverse bars for pivotally supporting said arms, and in which the said automatic means includes actuating levers carried on said transverse bars for pivotally moving said arms to advance said pneumatic heads with respect to said conveyor and the platens thereon to dislodge the envelopes from the respective platens, and with cams carried on said conveyor for actuating said levers to advance the pneumatic heads to seat them on the upwardly facing surfaces of the platens while moving in the lower run of the conveyor.

11. In a machine of the kind described, the combination of a supply hopper for containing a pack of envelopes with distinctively spaced mechanical indicia on the faces thereof, said hopper having a discharge opening in the bottom thereof for the successive discharge of envelopes therethrough, said indicia capable of cohering to a platen composed of a like material, a conveyor having an upper run lying below the discharge opening of said hopper, a series of platens on said conveyor passing the hopper below and in alignment with the bottom discharge opening thereof and the envelope exposed through said discharge opening, and also means controlled by the conveyor for causing the bottom envelope in the supply hopper to attach itself to a predetermined platen as it passes under the supply hopper, a series of receiving hoppers located below the lower run of said conveyor, and corresponding respectively to each of the distinctive mechanical indicia on said envelopes, and a series of ejectors located above the lower run of said conveyor including two ejector units spaced apart from each other a distance corresponding to the spacing of the indicia on said envelopes to effect the dislodgment of predetermined envelopes and the transfer of the same to their respective receiving hoppers.

12. In mechanism for sorting envelopes having distinctive indicia on their faces, the combination of a plurality of platens, a supply hopper containing the said envelopes and having a discharge opening, means for moving the platens along a path under the said hopper in proximity to said discharge opening, means for effecting the transfer of the bottom envelope in the hopper through said discharge opening and onto the said platens in succession as they pass, means for effecting the attachment of each envelope to a platen to which it has been transferred to enable it to advance with the same, a plurality of ejectors including pneumatic heads with automatic means for advancing the heads to the sides of said platens remote from the envelopes they are carrying, an air duct carrying compressed air to the pneumatic heads, a valve in said duct normally holding the duct closed, and automatic means for opening said valve when the pneumatic heads seat on the platen to direct air against the envelope carried by the platen and dislodge the same therefrom.

13. In mechanism for sorting envelopes or the like, for mailing, with respect to their destination, the combination of a plurality of carrier platens each having a facing sheet adhering throughout its area to a face of the same, a plurality of envelopes having a certain substance disposed along lines extending transversely across the envelopes, said lines spaced apart a predetermined distance distinctive to the envelope carrying the same, said substance and said facing sheets having the characteristic of cohering to each other when pressed together while in contact with each other, means for advancing the said envelopes along a route of travel, means for pressing the envelopes successively against the facing sheets respectively to enable each platen to support and carry its corresponding envelope, a plurality of stations along said route of travel corresponding to said destinations, a pair of ejecting devices located at each of said stations, the individual ejectors at each station being spaced apart from each other a distance equal to the distance between said lines along which said certain substance is disposed for that destination and station, and means at the stations for actuating the ejectors to dislodge the envelopes from the platens that correspond to the destinations to which the envelopes are addressed.

14. In mechanism for sorting envelopes addressed to different destinations, into a series of collecting stations corresponding to the destinations to which they are to be mailed to their individual destinations addressed thereon, the combination of a plurality of carrier platens, each having a facing sheet adhering throughout its area to a face of the platen, a plurality of envelopes having a certain substance disposed along distinctively located and spaced apart lines extending transversely across the envelopes said lines on certain envelopes being spaced apart predetermined distinctive distances, distinctive with respect to the desired destination for the envelope carrying the same, said substance and said facing sheets having the characteristic of cohering to each other when pressed together while in contact with each other, means for advancing the said platens along a route of travel, means for successively pressing envelopes against the facing sheets of the platens respectively to enable each platen to support and carry an envelope, a plurality of stations spaced along said route of travel corresponding respectively to the individual destinations of said envelopes, a pair of ejecting devices located at each of said stations, the individual ejectors of said pairs of ejectors at the several stations being spaced apart transversely from each other different distinctive distances respectively equal to the predetermined different distances between the said lines along which said certain substance is disposed on said envelopes, each platen and its facing sheet having a plurality of transversely spaced groups of perforations in line with said respectively spaced pairs of ejectors, said ejectors having pneumatic blower heads respectively overlying different areas of said groups of perforations; and automatic means for actuating said ejectors to advance said blower heads to press the same against each facing sheet at each group of perforations; and means for leading a current of air through said blower heads, and passing down through adjacent areas of said groups of perforations, and thereby enabling the blower heads at the stations to detach the envelopes from their corresponding platens at the stations corresponding to their destinations.

15. Mechanism for sorting envelopes or the like according to claim 14, in which the said substance applied to the envelopes is a latex material, and the facing sheet carried by the platens is latex, said substance and latex operating to effect the cohesion of the latex material of the envelopes to the latex facing sheets.

16. Mechanism for sorting envelopes or the like according to claim 14, in which the means for advancing the platens along their route of travel includes an endless conveyor having an upper run, means for maintaining a supply of the said envelopes in a pack above the upper run of the conveyor, and means for drawing down the bottom envelope of the pack onto each platen as it passes the same, and thereby effecting the cohesion of an envelope to the latex facing sheet on each platen.

17. Mechanism for sorting envelopes or the like according to claim 14, in which the means for advancing the platens along their route of travel includes an endless conveyor having an upper run, means for maintaining a supply of the said envelopes in a pack above the upper run of the conveyor; and in which the said ejectors are located above the lower run of the conveyor; and including receiver hoppers below the said lower run of the conveyor at said stations, into which the envelopes blown off the platens, fall.

18. As a new article of manufacture to facilitate a mail sorting operation as to States, cities, or foreign countries, and their cities, an envelope to cooperate with one of a series of carrier platens each having a facing of pressure sensitive latex for effecting a temporary attachment thereto of an envelope, said envelope having indicia composed of pressure sensitive latex applied thereto in a pair of spaced transverse strips, said strips being spaced apart a predetermined distance distinctive to the destination described in an address applied to the envelope, the said latex strips operating when the envelope is pressed against a predetermined platen to cohere to the latex facing of the platen and enable the platen to function as a carrier for that envelope.

19. As a new article of manufacture, an envelope according to claim 18, in which the said latex substance is applied in two strips on each face of the envelope and with pressure sufficient to offset the surface of the material of the envelopes inwardly, so that the outer faces of the strips are below the surface of the normal face of the envelopes, thereby enabling two envelopes with the same destination to be superposed on each other, even if one of the envelopes is lying on the other in a reversed position, without causing the strips of one of the envelopes to adhere to the strips of the other envelope.

References Cited in the file of this patent

UNITED STATES PATENTS

| | | |
|---|---|---|
| 1,613,968 | Stokes | Jan. 11, 1927 |
| 2,609,928 | Doost | Sept. 9, 1952 |
| 2,664,197 | Pfister | Dec. 29, 1953 |
| 2,697,514 | Stahl | Dec. 21, 1954 |

FOREIGN PATENTS

| | | |
|---|---|---|
| 750,824 | Great Britain | June 20, 1956 |